Figures 1, 2A:
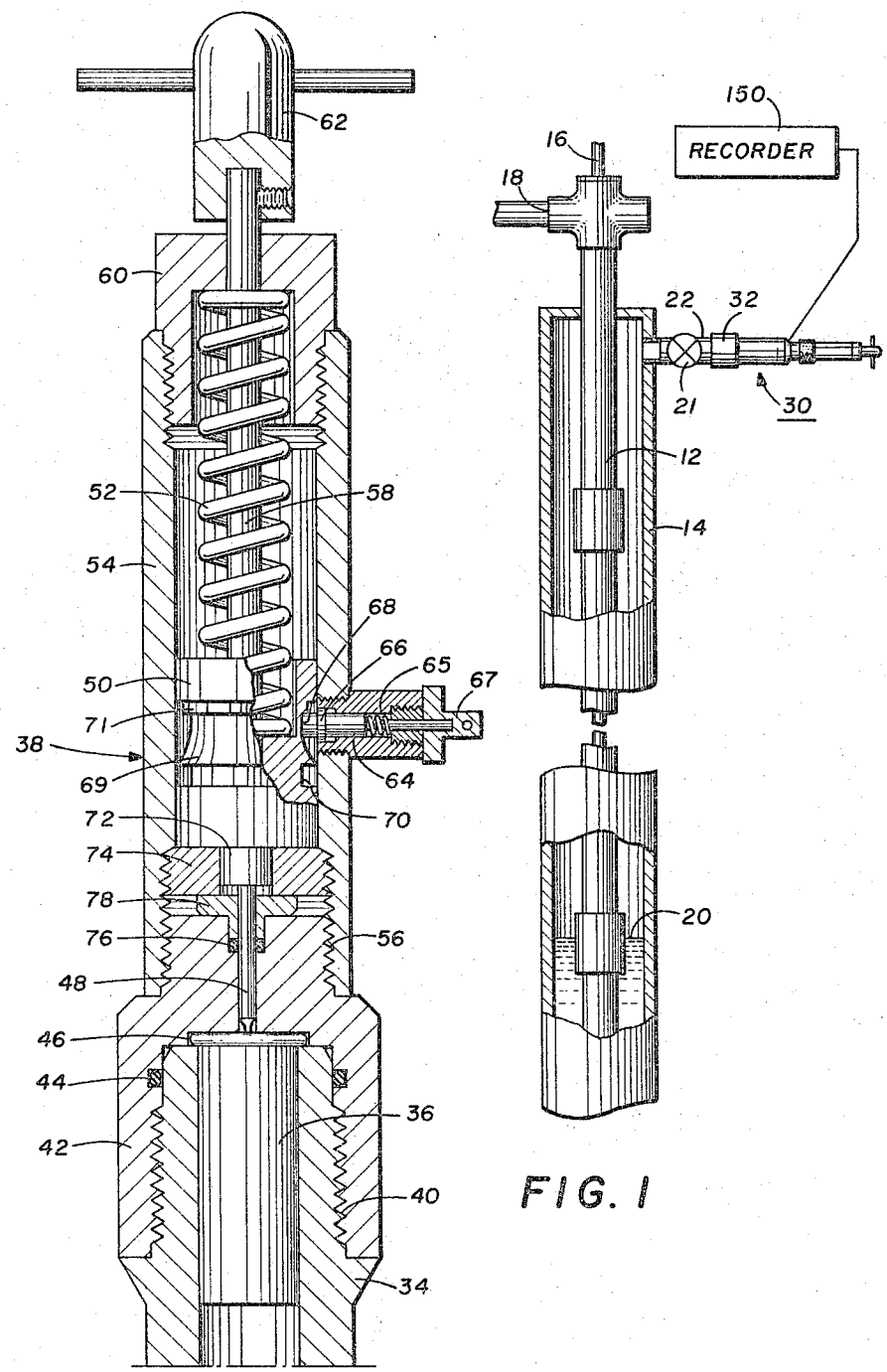

INVENTOR
JAMES N. McCOY
BY D. Carl Richards
ATTORNEY 3,316,997
ECHO RANGING APPARATUS
James N. McCoy, Box 1388, Wichita Falls, Tex. 76307
Filed Feb. 11, 1965, Ser. No. 431,837
14 Claims. (Cl. 181—0.5)

The present invention relates to acoustical echo ranging and more particularly, but not by way of limitation, relates to an apparatus for inducing an acoustical pressure wave in the casing of an oil well and also for detecting the reflected pressure waves so that the depth of fluid standing in the well may be determined.

As is well known in the petroleum industry, it is often desirable to determine the level of fluid standing in the casing of a well bore. One method for ascertaining the fluid level is described generally in U.S. Patents 2,047,974 and 2,156,519 wherein a pressure wave is induced in the casing at the surface. The pressure wave travels downwardly through the gas in the casing to the surface of the liquid and is reflected back to the top of the casing. The returning pressure wave or echo is detected and usually recorded with respect to time. The depth of the level of the liquid can then be calculated from the elapsed time. Or, if a string of tubing is standing in the casing and the lengths of the joints are known, the depth may be determined by counting the small pressure wave reflections from the tubing collars. In the above-referenced patents, the pressure wave is generated by releasing a high pressure gas from an impulse chamber by means of a valve. The apparatus required for that purpose is relatively large and complex and requires considerable time to set up.

The object of this invention is to provide an echo ranging apparatus for both generating the acoustical pressure wave and detecting reflected pressure waves which is very compact and which can be quickly and easily set up to determine the liquid level in a well.

Another object of the invention is to provide such a device which may be easily manufactured and assembled.

Still another object of the invention is to provide such a device wherein both the pressure wave generator and a relatively large detector are housed in a minimum volume.

A further object of the invention is to provide a pressure wave detector which is shock mounted and has exceptional pressure strength as a result of its design.

Yet another object is to provide a detector design having increased area and therefore increased sensitivity and electrical response.

Still another object is to provide such an apparatus which may be used effectively in a low pressure atmosphere.

A further object of the invention is to provide such a device wherein the detector microphone is mounted such that it can be stressed in substantially all directions by pressure variations to thereby increase its electrical response.

A further object is to provide such a device wherein the detector microphone is better protected from foreign material and requires less frequent cleaning.

These and other objects are accomplished by means of an apparatus comprising a housing for connection to the flow channel in which a pressure wave is to be induced, a blast tube extending centrally through the housing for directing pressure energy from a source into the flow channel, and a pressure sensitive detector disposed in a pressure chamber formed around the blast tube, the pressure chamber communicating with the flow channel through a restricted flow port for applying variations in pressure in the flow channel to the detector.

In accordance with a more specific aspect of the invention, the blast tube forms a chamber for receiving an explosive charge to produce the pressure wave, a tubular detector for detecting variations in pressure is disposed concentrically about the blast tube, and a shielding means is disposed about the detector to form an annular pressure chamber.

Figure 2B:
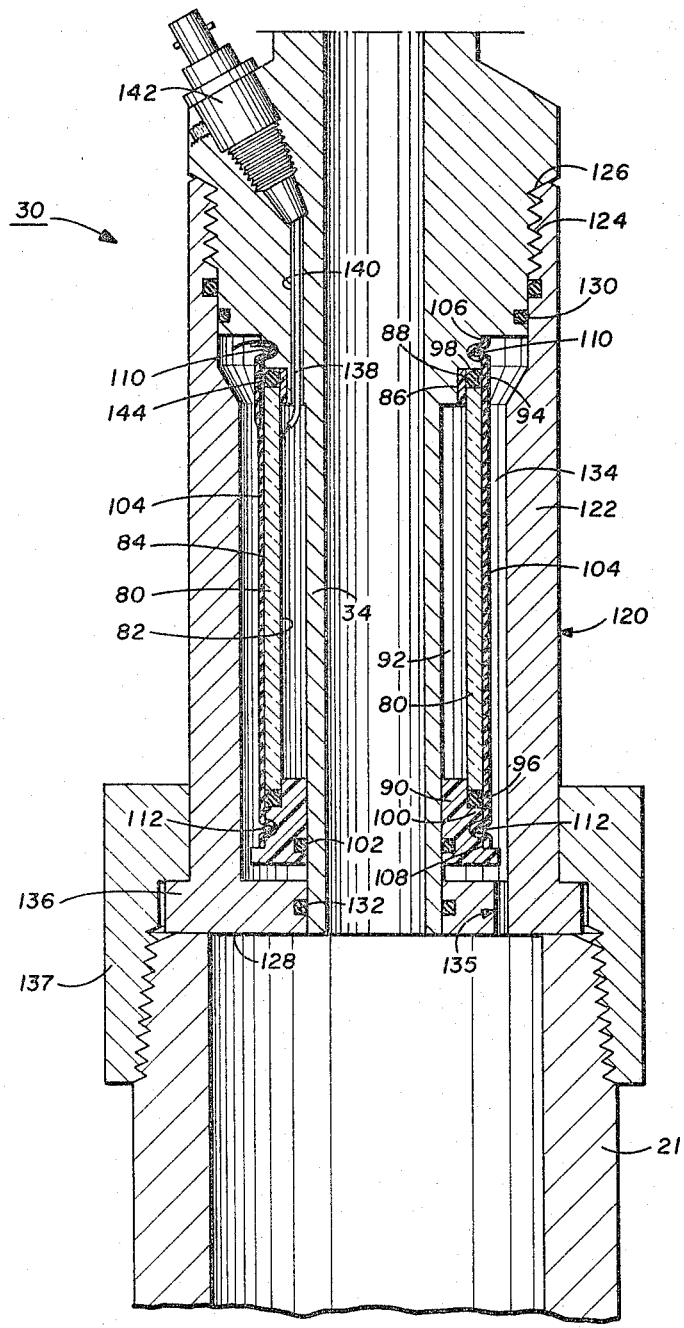
Figure 3:
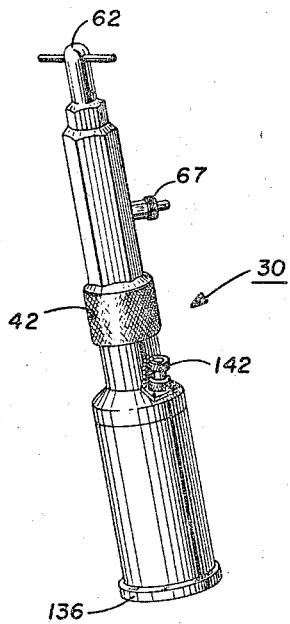

Additional aspects, objects and advantages of the invention are hereafter pointed out in detail in the appended claims, which are intended to constitute the sole limitation upon the scope of this invention, and in the following detailed description and drawings, wherein:

FIGURE 1 is a schematic diagram of an oil well illustrating the manner in which the apparatus constructed in accordance with the present invention may be used;

FIGURES 2A and 2B, in conjunction, constitute a longitudinal sectional view of an apparatus constructed in accordance with the present invention; and FIGURE 3 is a perspective view of the device of FIGURES 2A and 2B.

Referring now to the drawings, and in particular to FIGURE 1, a string of tubing 10 is shown disposed in a string of casing 14. A string of sucker rods 16 extends through a pumping T 18 to a pump (not illustrated) located at the bottom of the well to force the liquid standing to a level 20 upwardly through the tubing 12. Access to the casing 14 may be obtained through the casing valve 21 and a short nipple 22. The casing valve 21 is customarily installed at all wellheads. An apparatus constructed in accordance with the present invention is indicated generally by the reference numeral 30 and is connected to the nipple 22 as will presently be described.

The apparatus 30 is shown in longitudinal cross section in FIGURES 2A and 2B. The apparatus 30 is comprised of a blast tube 34 disposed along the central axis of the apparatus. The blast tube 34 is sized to receive a blank cartridge 36 illustrated in dotted outline. The cartridge may be of conventional construction, such as a standard 10 gauge. Also, .45 or .38 caliber shells may be used by inserting a suitable adapter liner in the chamber. The shell 36 is held in the end of the blast tube 34 by a firing mechanism indicated generally by the reference numeral 38 which may be of any suitable design. The firing mechanism 38 is connected to the threaded end 40 of the blast tube by the threaded breech cap 42 which may be knurled around its periphery to facilitate hand tightening. An O-ring 44 provides a pressure seal between the blast tube 34 and the breech cap 42. A recess 46 is formed in the breech cap 42 to receive the end of the cartridge case. A firing pin 48 is connected to a piston 50 which is loaded by a spring 52. The piston 50 is reciprocally disposed in a sleeve 54 which is connected to the breech cap 42 by the threaded coupling 56. A plunger 58 extends through a plug 60 threaded into the end of the sleeve 54 and a suitable knob 62 facilitates cocking the firing mechanism. A combination safety and trigger mechanism 64 is comprised of a pin 66 which is biased inwardly to the piston 50 by the spring 65 and may be manually disengaged from the piston 50 by the knob 67. The piston has a safety groove 68 which is positioned so that when the pin 66 is in the groove 68, the firing pin is withdrawn into the breech cap 42. A second groove 70 is provided for receiving the pin 66 and retaining the piston 50 in cocked position. A tapered face 69 extends between the bottom of the groove 68 to the top of the groove 70 so that the pin 66 will ride up the incline as the piston is moved from the safe position to the cocked position. A shallow groove 71 permits the piston 50 to travel down until the firing pin strikes the primer of the cartridge. The piston 50 has a portion 72 of reduced diameter which is received in a washer 74 which is threaded into the sleeve 54. An O-ring 76 provides a fluid seal around the firing pin 48 and is secured in place by the grommet 78.

In order to fire the cartridge 36, the knob 62 is pulled out to withdraw the piston 50. The pin 66 rides up the inclined surface 69 and drops in the groove 70 to secure the piston 50 and firing pin 48 in cocked position. Then when the knob 67 is pulled out until the pin 66 clears the groove 70, the spring 52 will drive the firing pin 48 into the primer of the cartridge 36 to detonate the cartridge in the conventional manner. Whenever it is desired to put the firing mechanism in safe position, the knob 62 is pulled out until the pin 66 slides down the shallow groove 71 and drops in the safety groove 68.

A tubular piezoelectric pressure transducer or detector 80 is disposed concentrically about the blast tube 34. The detector may be any conventional piezoelectric microphone crystal, such as a suitable ceramic or barium titanate, and has metallic film electrodes 82 and 84 on the inside and outside cylindrical surfaces, respectively, so that the electrical voltage produced by any physical stress on the detector will appear between the two electrodes. One end of the detector sleeve 80 is supported on a first cylindrical land 86 of the blast tube 34 and is electrically insulated therefrom by a suitable nonconductive sleeve 88. The other end of the detector sleeve is supported by one cylindrical land of a ring-shaped insulating support 90. An O-ring 102 provides a fluid seal between the spacer 90 and the blast tube 34. An annular compression chamber 92 is thus formed between the detector sleeve 80 and the blast tube 34 which is sealed by means presently to be described. O-rings 94 and 96 are disposed around the insulating sleeve 88 and around the lower land of the ring spacer 90 and are positioned between the ends of the detector sleeve and radial shoulders 98 and 100, respectively. A neoprene sleeve 104, or protective sleeve fabricated from a similar suitable elastic insulating material, is positioned over the sleeve detector 80 and extends over lands 106 and 108 of the blast tube 34 and the support ring 90. The ends of the neoprene sleeve 104 are secured in place by suitable tension bands 110 and 112 which are received in grooves in the lands 106 and 108, respectively. Thus the combination of the sleeve 104 and the O-rings 94 and 96, together with the O-ring 102, completely seal the compression chamber 92, which is preferably partially evacuated so as to improve response in low pressure atmospheres and to prevent the atmospheric pressure from ballooning the neoprene sleeve 104.

A housing indicated generally by the reference numeral 120 forms a shield for the detector sleeve 80 and is comprised of a tubular sleeve portion 122 disposed around the detector sleeve 80. The sleeve 122 is connected to a third land on the blast tube 34 by the threaded coupling 124. The end of the sleeve 122 may be abutted against the radial shoulder 126 of the blast tube 34 to lock the coupling and limit travel during makeup. The shield has a disk portion 128 which is disposed around the end of the blast tube 34. O-ring 130 provides a seal between the blast tube 34 and the shield 120 so as to provide an annular chamber 134 which when connected to the well as hereafter described, provides a fluid seal between the well and atmosphere. O-ring 132 at the opposite end of the sleeve detector 80 seals the chamber against dust and dirt. The disk portion 128 forms a peripheral shoulder 136 around the end of the shield 120. A threaded sleeve 137 has an inturned shoulder which engages the shoulder 136 when the sleeve 137 is threaded onto the nipple 22 to mechanically couple the housing 120 to the nipple 22. A small, flow restrictive port 135 is formed by a bore in the disk portion 128 to provide fluid communication between the flow channel formed by the nipple 22 and the pressure chamber 134 without unduly exposing the detector sleeve 80 to damage and contamination.

An electrical conductor 138 is connected to the inside electrode film 82 and extends through a passageway 140 to a high pressure feed-through terminal 142. The terminal 142 is comprised of a conventional conductor rod sealed by an epoxy in a sleeve threaded into the enlarged portion of the blast tube. A BNC connector receives the protruding rod and is secured in a bore in the blast tube 34 by a set screw (not illustrated). The conductor 138 is electrically insulated from the blast tube conductor 34. The electrical circuit is completed by a bare jumper wire 144 extending from the outer electrode film 84 under the neoprene sleeve 104 and under the tension band 110 into contact with the blast tube 34, which is in contact with the housing of the BNC connector.

When using the apparatus 30, the housing 120 is merely connected to a nipple 22 communicating with the casing through the casing valve 21 by means of the sleeve 137. After the apparatus 30 is connected to the nipple, the casing valve 21 can be opened without loss of pressure because the apparatus 30 is pressure tight. The recording system 150 is then connected by a suitable lead to the connector 142. The shell 36 should be inserted before the apparatus 30 is connected to the nipple 22, or at least before the valve 21 is opened, if the casing contains pressure. This is accomplished by removing the knurled breech cap 42, placing the shell in the chamber, and then replacing the breech cap 42 and the remaining firing mechanism. The firing mechanism is then cocked by pulling the knob 62 and easing the pin 66 into the recess 70. After the recording system 150 has been energized, the knob 67 is pulled to release the piston 50 and fire the blank cartridge. The pressure wave resulting from discharge of the cartridge passes through the blast tube 34 and through the flow channel formed by the nipple 22 and the valve 21 into the casing 14. The pressure wave travels downwardly and upon striking each collar of the tubing 12 produces a small echo pressure wave and upon striking the surface 20 of the liquid produces a large echo pressure wave. These echoing pressure waves return along the same flow channel including the valve 21 and nipple 22. The pressure variations are communicated through the small port 135 to the chamber 134 and are applied uniformly over the entire outer surface of the detector sleeve 80 through the resilient neoprene sleeve 104. The resulting physical deformation of the detector sleeve 80 produces a voltage between the film electrodes 82 and 84 which is recorded by the recording means 150 as a line trace having amplitude spikes for each returning echo.

When the cartridge is fired, a very large echo spike is produced as a result of the high pressure resulting in the nipple 22. Generally, the returning echo from each tubing collar is relatively small, although easily distinguished, and the echo returning from the surface of the liquid is relatively large. Thus the level of the liquid can be computed by counting the collar echoes, if the length of the tubing joints are known, or can be computed as a function of elapsed time provided certain assumptions are made regarding the density of the gas in the casing. The first method is preferred because then no particular accuracy is required in maintaining a time scale on the reflection record or in measuring the density of the gas in the casing.

From the above detailed description of a preferred embodiment of the invention, it will be appreciated that both the pressure wave generator and the pressure wave detector are located in a minimum volume adjacent the end of the flow channel communicating with the casing. The initial pressure wave is directed axially of the flow channel for maximum efficiency. The apparatus is relatively simple and can be easily manufactured and assembled. Further, the apparatus 30 may be very quickly and easily attached in operative relationship to the casing and may be operated by relatively unskilled personnel. By reason of the large area of the detector sleeve 80, the electrical response is quite good. The electrical response is enhanced by the fact that the ends of the detector sleeve are not confined so that the detector sleeve can be stressed in all directions. Further, the detector sleeve is shock mounted by the O-rings at each end and by the neoprene sleeve 104 so as to withstand rough handling, and because of its tubular shape, the detector sleeve 80 can withstand higher pressures. Further, by reason of the tubular shape of the detector sleeve, the areas which are subjected to pressure, and the areas of the electrodes, are a maximum to enhance sensitivity. Also, the chamber 92 within the sleeve detector 80 may be evacuated so that the apparatus may be efficiently used in low atmospheric pressure conditions. Since the detector sleeve 80 is disposed in a fluid-tight chamber except for the small port 135, it is protected from dirt and other contaminants and does not require cleaning very often.

The use of a cylindrical detector in the form shown in FIGURE 2B is preferred since use of the area available is maximized for generation of an output signal. By this means the unit has a high sensitivity and produces a maximum output signal for a given pressure change. However, it will be understood that the detector may actually be provided in forms other than the cylindrical embodiment shown in the drawings. For example, an array of pressure-sensitive crystals of planar character, one or more, may be mounted in the annulus between the tube 34 and the shield 120. The spaced coaxial relationship between the tube 34 and the shield 120 provides a chamber in which the detector may be mounted. In such case it is protected as is cylinder or sleeve 80 and yet is compatible with the coaxial construction.

Thus, while a preferred embodiment of the invention involving a cylindrical detector mounted in the particular supporting structure has been described in detail, it is to be understood that various changes, substitutions and alterations can be made therein without departing from the spirit and scope of the invention as defined by the appended claims.

What is claimed is:

1. In an apparatus for determining the location of the liquid level in a well having a string of tubing assembled therein and a flow channel communicating with the well, the combination which comprises:
    a housing for connection to the flow channel,
    barrel means for supporting an explosive source centrally in the housing forming a flow channel extending centrally through the housing for directing energy from the source into the flow channel,
    a pressure sensitive detector disposed symmetrically around the barrel means, and
    shielding means for the detector having a restricted flow port therethrough communicating with the well for applying variations in pressure in the flow channel to the detector.

2. In echo ranging apparatus, the combination comprising:
    a blast tube for transmitting a high pressure impulse,
    a detector sleeve disposed around the blast tube for generating a signal representative of changes in pressure,
    a protective housing disposed around the detector sleeve and connected to the blast tube to form an annular chamber around the detector sleeve and having fluid port means for communicating pressure generated within said tube outside the housing to the annular chamber, and circuit means leading from said sleeve for transmission of signals generated by said sleeve to outside said housing.

3. The combination defined in claim 2 wherein one end of the blast tube forms a firing chamber for a blank cartridge and whereby the apparatus is further characterized by breech means for closing the blast tube and firing the cartridge.

4. The combination defined in claim 2 further characterized by means for coupling the housing to a tubular conduit with the blast tube axially aligned with the conduit, and wherein the port communicates between the interior of the conduit and the annular chamber.

5. The combination defined in claim 2 wherein:
    the detector sleeve is comprised of a cylindrical sleeve of piezoelectric material having electrode films formed on the inside and outside surfaces, and
    the detector sleeve is supported at its ends by spacer means around the blast tube to form an annular compression chamber between the detector sleeve and blast tube.

6. The combination defined in claim 5 further characterized by:
    resilient fluid sealing means forming a peripheral fluid seal between each end of the detector sleeve and the blast tube whereby the compression chamber will be fluid tight and may be partially evacuated.

7. The combination defined in claim 6 wherein the resilient sealing means is disposed at the ends of the detector sleeves and provides a shock mounting for the detector sleeve.

8. The combination defined in claim 6 further characterized by an electrically nonconductive elastic sleeve disposed around the detector sleeve, the elastic sleeve extending beyond each end of the detectors and being secured to the spacer means at each end of the detector sleeves.

9. In echo ranging apparatus, the combination comprising:
    an elongated blast tube for receiving a pressure impulse at one end and delivering the impuse to a conduit disposed at the other end, said blast tube having a small diameter portion extending from said other end and three lands of successively larger diameters adjacent said one end,
    a spacer ring disposed around the small diameter portion of the blast tube having a smaller diameter land adjacent the small diameter land on the blast tube and a larger diameter land spaced from the smaller diameter land,
    annular sealing means disposed between the spacer ring and the blast tube,
    a tubular detector sleeve disposed around the small diameter portion of the blast tube, one end of the detector sleeve being positioned around the smallest diameter land of the blast tube, and the other end being positioned around the smaller diameter land of the spacer ring,
    a resilient sleeve disposed around the detector sleeve and extending around the middle land of the blast tube and around the larger diameter land of the spacer ring,
    a tubular housing disposed around and spaced from the resilient sleeve to form an annular pressure chamber, the tubular housing having one end threadedly connected to the largest diameter land of the blast tube and the other end sealingly engaging said other end of the blast tube, and having a port therein for transmitting pressure variations to the pressure chamber for detection by the detector sleeve.

10. The combination defined in claim 9 wherein a peripheral shoulder is formed on the blast tube between the two smaller diameter lands and between the lands on the spacer ring and further characterized by a resilient ring disposed between each end of the detector sleeve and the adjacent shoulder.

11. The combination defined in claim 9 wherein the annular chamber formed between the detector sleeve and the blast tube is fluid tight and is partially evacuated.

12. The combination defined in claim 9 wherein the inside diameter of said one end of the blast tube is sized to receive a blank cartridge and further characterized by:
    a breech cap connected to said one end of the blast tube for retaining a cartridge in the blast tube and for sealing the end of the blast tube,
    means for detonating a cartridge positioned in the blast tube including a firing pin extending through the breech cap for striking the primer of the cartridge, and sealing means providing a peripheral seal between the firing pin and the breech cap.

13. The combination defined in claim 9 wherein:

the detector sleeve has metallic film electrodes disposed on the inside and outside surfaces, one of the electrodes is electrically connected to the blast tube, and the other electrode is electrically connected to an insulated conductor extending longitudinally through the blast tube to a pressure-tight electrical coupling for providing electrical connection to an indicator.

14. The combination defined in claim 9 further characterized by:

a peripheral shoulder formed around said other end of the tubular housing having a diameter approximately equal to a conduit through which a pressure impulse and echo are to be induced and received, and a coupling collar disposed around the peripheral shoulder, and having an inwardly directed shoulder at one end disposed around the housing for exerting a longitudinal force on the peripheral shoulder and internal threads at the other end, whereby when the coupling collar is threaded onto the end of the conduit, the inwardly directed shoulder will engage the peripheral shoulder and couple said other end of the housing to the end of the conduit.

References Cited by the Examiner

UNITED STATES PATENTS

| | | | |
|---|---|---|---|
| 2,403,535 | 7/1946 | Kremer | 340—18 |
| 2,560,911 | 7/1951 | Wolf | 181—.5 |
| 2,759,286 | 8/1956 | Moore | 42—79 |
| 2,916,970 | 12/1959 | Mutter | 89—14 |
| 2,927,301 | 3/1960 | Booth et al. | 340—18 |
| 3,100,023 | 8/1963 | Clements | 181—.5 |

BENJAMIN A. BORCHELT, *Primary Examiner.*

W. KUJAWA, *Assistant Examiner.*